United States Patent [19]
Dhyanchand et al.

[11] Patent Number: 5,301,098
[45] Date of Patent: Apr. 5, 1994

[54] FEEDFORWARD INVERTER PHASE CONTROL

[75] Inventors: P. John Dhyanchand; Vietson M. Nguyen; Sunil Patel; Chai-Nam Ng, all of Rockford, Ill.

[73] Assignee: Sundstrand Corporation, Rockford, Ill.

[21] Appl. No.: 911,549

[22] Filed: Jul. 9, 1992

[51] Int. Cl.$^5$ .......................................... H02M 7/537
[52] U.S. Cl. ........................................ 363/97; 363/41; 363/43; 363/71; 363/98; 322/17; 322/28
[58] Field of Search ....................... 363/97, 98, 41, 43, 363/64, 71; 322/17, 28

[56] References Cited

U.S. PATENT DOCUMENTS

| | | | |
|---|---|---|---|
| 3,205,424 | 11/1965 | Bates | 321/18 |
| 3,458,797 | 7/1969 | Larsen | 321/9 |
| 3,477,010 | 11/1969 | Ve Nard | 321/5 |
| 3,671,846 | 6/1972 | Corey | |
| 3,775,662 | 11/1973 | Compoly et al. | 321/5 |
| 4,032,832 | 6/1977 | Miller | 363/43 |
| 4,961,130 | 10/1990 | Kirchberg, Jr. | 363/41 |
| 4,994,956 | 2/1991 | Kirchberg, Jr. et al. | 363/95 |
| 5,001,622 | 3/1991 | Kirchberg, Jr. et al. | 363/95 |
| 5,040,105 | 8/1991 | Dhyanchand et al. | 363/43 |
| 5,043,857 | 8/1991 | Kirchberg, Jr. et al. | 363/41 |

FOREIGN PATENT DOCUMENTS

| | | |
|---|---|---|
| 915189 | 3/1982 | U.S.S.R. |
| 993411 | 1/1983 | U.S.S.R. |
| 2089589A | 1/1981 | United Kingdom |

*Primary Examiner*—Emanuel T. Voeltz
*Attorney, Agent, or Firm*—Marshall, O'Toole, Gerstein, Murray & Borun

[57] ABSTRACT

An inverter system for inverting variable input DC and providing therefrom controlled output AC including a feedforward sensor for sensing a variable parameter of the input DC, a feedback AC sensor for sensing the controlled output AC and an inverter controller responsive to the variable parameter of the input DC and to the controlled output AC for regulating the magnitude of the controlled output AC.

20 Claims, 13 Drawing Sheets

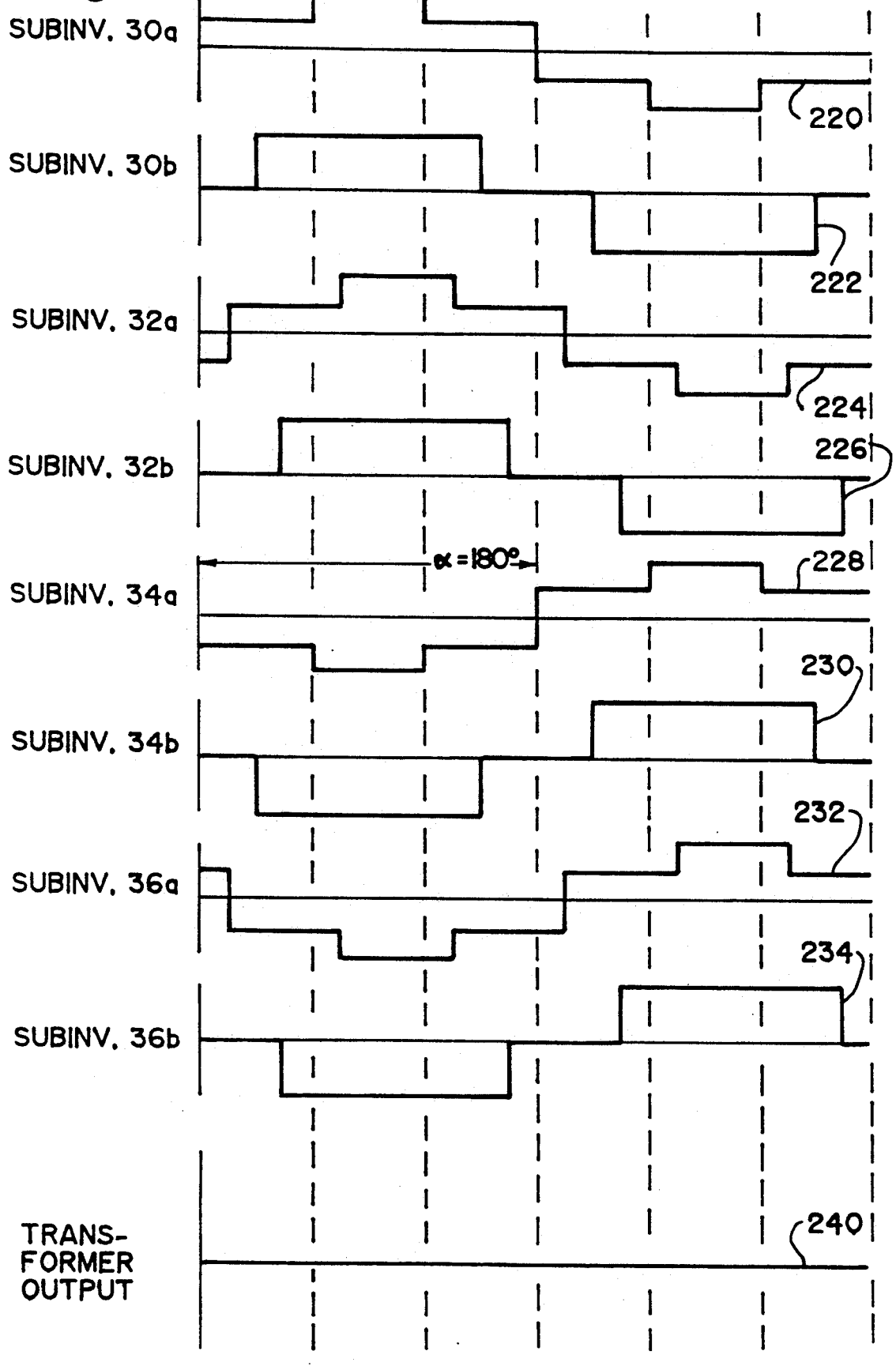

FEEDFORWARD INVERTER PHASE CONTROL

BACKGROUND OF THE INVENTION

The present invention relates to a power conversion system, and more particularly to a plural inverter system for converting input DC into controlled output AC wherein both the controlled output AC and a parameter of the input DC are sensed for controlling the controlled output AC.

Copending patent application, having Ser. No. 454,434 filed on Dec. 20, 1989 and assigned to the same assignee as the present application, discloses a conversion system for providing a stepped output utilizing plural inverters. The system shown therein responds to the output AC for controlling the phase angle between the inverter outputs in order to control the output AC.

Power conversion systems are commonly used in many applications to convert a variable DC input into controlled AC output. For example, copending application Ser. No. 07/911,542 filed on Jul. 9, 1992 shows an inverter for use with systems, such as those on aircraft, where the input DC can vary 2:1 or more. If desired, the control AC output is designed to have constant voltage in order to supply loads with electrical power. The inverter used in such systems may be of the stepped waveform type. An inverter of this type is disclosed in U.S. Pat. No. 3,775,662 to Compoly et al. Such a stepped-waveform inverter generates an output having a stepped shape that generally approximates a sine wave. The purpose of approximating a sine wave is to reduce the size of the filters, provided at the output of the inverter, that are used to remove unwanted harmonics. While previous stepped-waveform inverters may accomplish such goals, efficient and effective methods of control of such inverters have heretofore been lacking.

Prior application having U.S. Ser. No. 454,434 filed on Dec. 20, 1989, discloses a power conversion system utilizing a plurality of subinverters each inverting a DC input into AC output for supply to a summing transformer which sums the outputs from the subinverters to provide AC power having a stepped waveform. The system regulates the AC power by controlling a phase angle between the waveforms produced by at least some of the subinverters.

If the input DC varies, the variation in DC must pass through the system and vary the output AC in order for corrective action to be taken by the inverter control system. The feedback loop which senses the output AC and provides appropriate correction is slow, because any changes or transients in the input DC voltage must pass through the inverter, the control, and any associated filters, each having time constants which slow up the response.

SUMMARY OF THE INVENTION

Use of a feedforward approach by sensing changes and/or transients in a parameter of the input DC voltage directly allows faster compensation for these changes or transients. Additionally, a high-pass filter between the input DC sensing arrangement and the control circuit allows any DC changes to be detected more rapidly.

Accordingly, the present invention includes an inverter for inverting input DC into a controlled AC output, a feedforward sensor for sensing a parameter of the input DC to providd a feedforward signal varying in accordance with the parameter, a feedback sensor for sensing the controlled output AC to provide a feedback AC signal varying in accordance with the controlled output AC, and an inverter controller responsive to the feedforward signal and the feedback AC signal for controlling the inverter in order to in turn control the controlled output AC dependent upon the feedforward signal and the feedback AC signal.

Another aspect of the invention includes a method for controlling an inverter in order to invert input DC into controlled output AC, the method including the steps of sensing a variable parameter of the input DC, sensing the controlled output AC, and controlling the inverter in response to the variable parameter and to the controlled output AC.

BRIEF DESCRIPTION OF THE DRAWINGS

These and other features and advantages will become more apparent from a detailed consideration of the invention when taken in conjunction with the drawings in which:

FIG. 8 illustrates a third-phase relationship of a number of waveforms generated by the inverter and a waveform produced by the summation of those waveforms;

DETAILED DESCRIPTION

Figure 1:
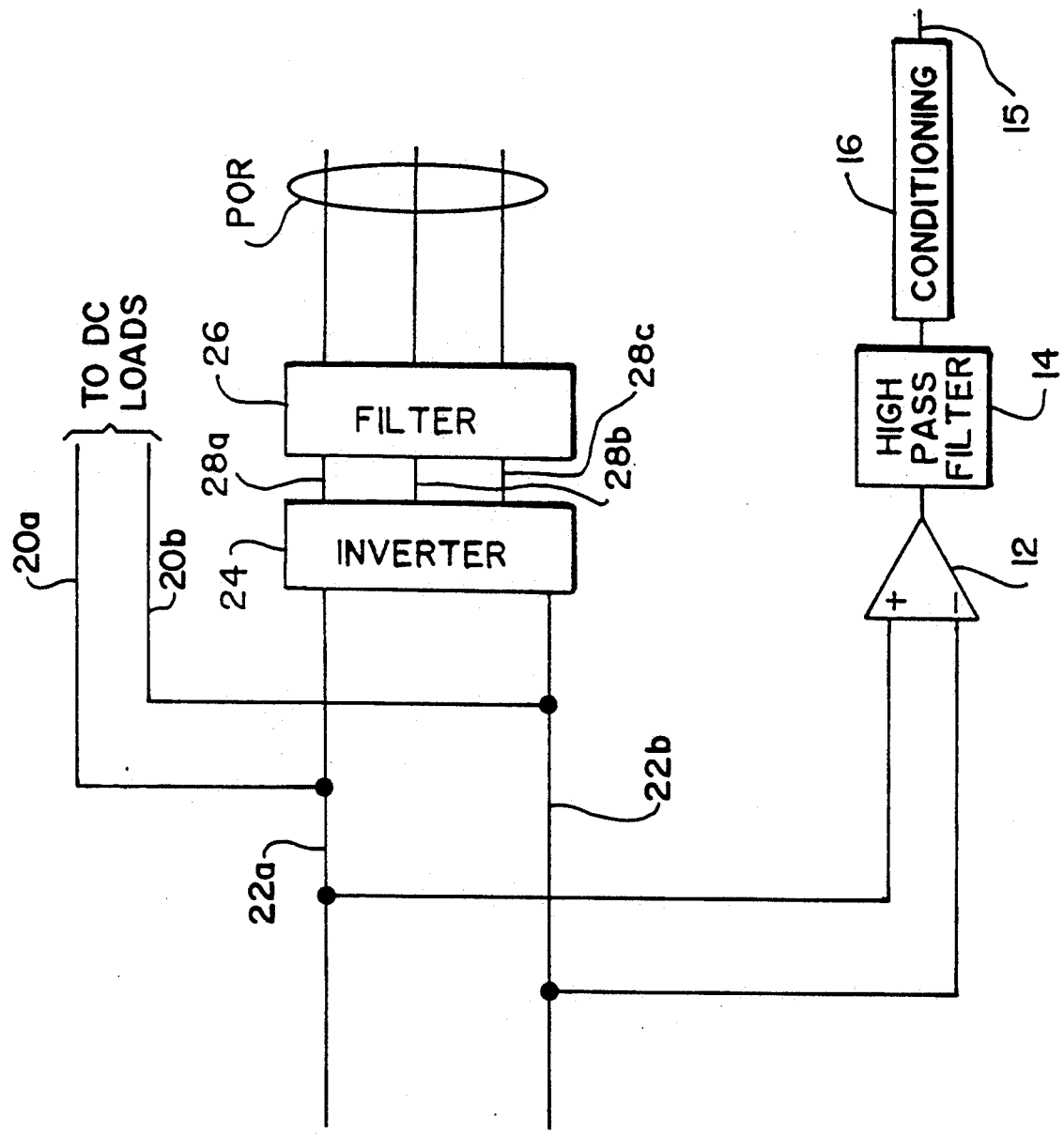
FIG. 1 is generalized block diagram of an inverter system incorporating the present invention.

A block diagram of a preferred embodiment of an inverter system 10 incorporating the present invention is shown in FIG. 1. This inverter system 10 includes inverter 24 receiving input DC over input lines 22a and 22b. This DC can be supplied to DC loads over lines 20a and 20b. Inverter 24 inverts the input DC on lines 22a and 22b into three phase output AC over lines 28a, 28b, and 28c. The output over lines 28a–28c is a stepped waveform. Filter 26 smooths the stepped waveform for providing sinusoidal AC output power over lines 29 to the AC load bus to which various AC loads can be connected.

As mentioned heretofore, changes in input DC must pass through the inverter, any inverter controls, and any possible filters, before those changes can be used to compensate for changes in output AC. Because of the time constants associated with the inverter, the inverter controller and filters, the control loop responds slowly to changes in input DC. By using a feedforward approach, however, changes in input DC can be sensed and used to provide much faster inverter controller response. Changes in input DC can be sensed by sensing a parameter of the DC. For example, if the DC is provided by a variable frequency source and filter, the frequency parameter can be sensed because the voltage of the input DC will vary according to variations in the frequency of the source. In the preferred embodiment, however, the voltage of the input DC is sensed directly. Accordingly, differential amplifier 12 senses the difference in DC voltage across lines 22a and 22b. This DC voltage is filtered by high-pass filter 14 which provides an output dependent upon the rate at which transients in the input DC occur. The output from high-pass filter 14 can be conditioned by conditioning circuit 16 if desired to provide an output on line 15 for use by the inverter control system. Thus, the signal on line 15 varies in accordance with the rate of change of the DC voltage on lines 22a and 22b but may vary in any other desired relationship wherein the signal on line 15 is continuous or at least has multiple points each having a corresponding level of DC voltage on lines 22a and 22b.

Figure 2:
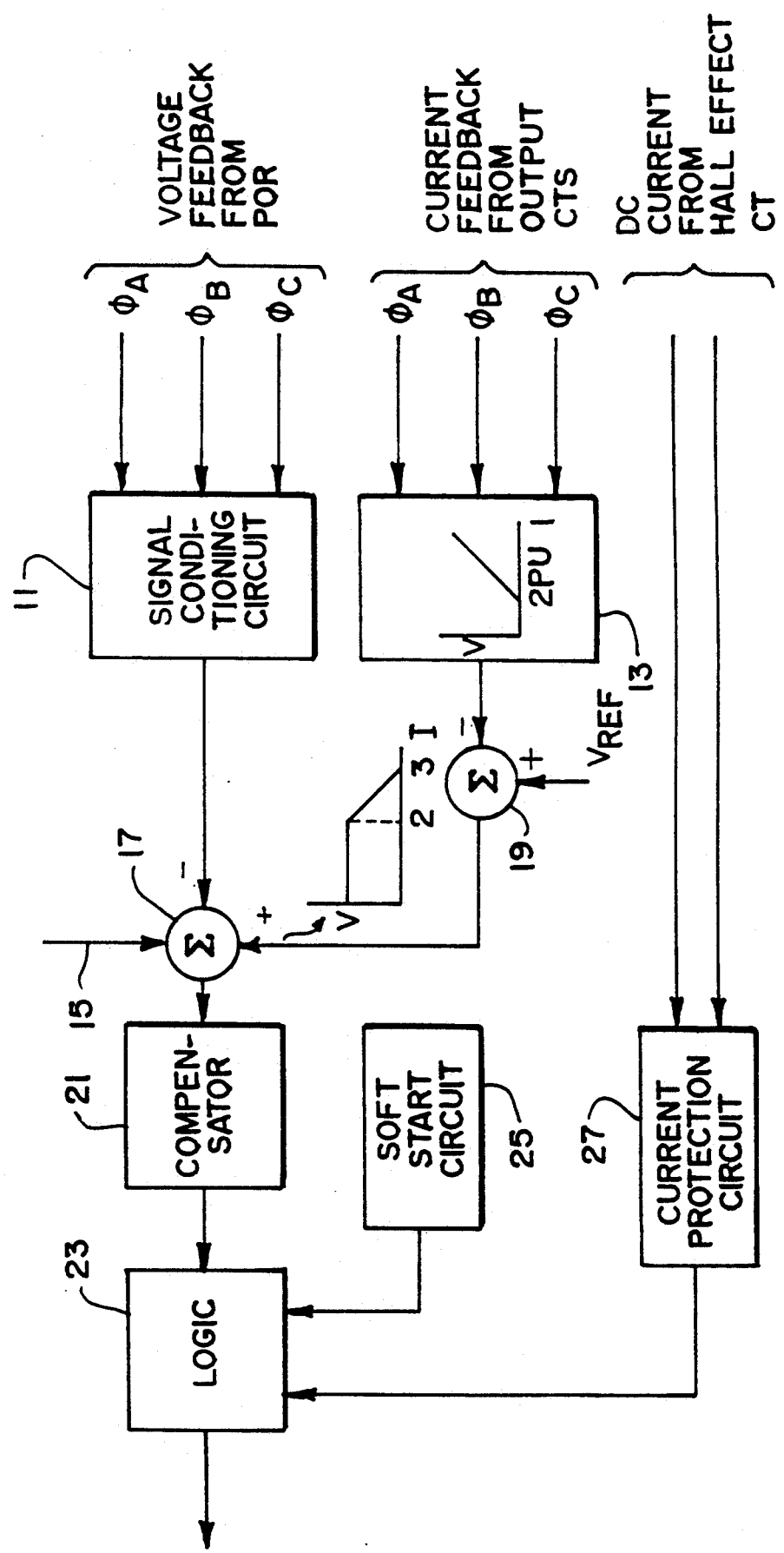
FIG. 2 is a block diagram illustrating the manner in which the inverter of FIG. 1 is controlled.

As shown in FIG. 2, inverter 24 includes an inverter control system which senses the phase voltage at the point of reference (POR) near the loads which are supplied power by inverter system 10. The phase voltages can be conditioned by signal conditioning circuit 11 and the output of signal conditioning circuit 11 is used as one input to summing junction 17. The phase current, on the other hand, is sensed at the output from the summing transformers. Signal conditioning circuit 13 provides the V/I response as shown in FIG. 2. This arrangement is designed to provide a voltage to summing junction 19 only when the phase current exceeds two per unit phase current units. These units can be of any chosen value, but, for illustration purposes only, a value of 58A per unit is suitable for the 20 KVA design shown herein. Summing junction 19 receives a reference voltage signal $V_{REF}$ in order to establish a set point voltage for the voltage at the point of reference. The output of summing junction 19 is connected as a further input to summing junction 17. Summing junction 17 also receives an input 15 from the feed-forward input DC sensor as shown in FIG. 1.

The output of summing junction 17 is used as an input to compensator 21 which provides signal level gain, lead and lag adjustment and buffering before it is supplied to logic arrangement 23. Logic circuit 23 controls the inverters in the way illustrated more fully hereinbelow. Logic circuit 23 also receives soft start input from soft start circuit 25 such that the output AC supplied to POR is gradually increased to the desired level in order to eliminate damaging inrush current transients that might occur by bringing the output AC up to the desired level too rapidly.

Futhermore, a hall effect sensor is used if desired for sensing the DC current in DC lines 22a and 22b. Current protection circuit 27 senses an overcurrent condition in the input DC current and will operate through logic 23 for turning off inverter 24 during periods of over-current.

Figure 3:
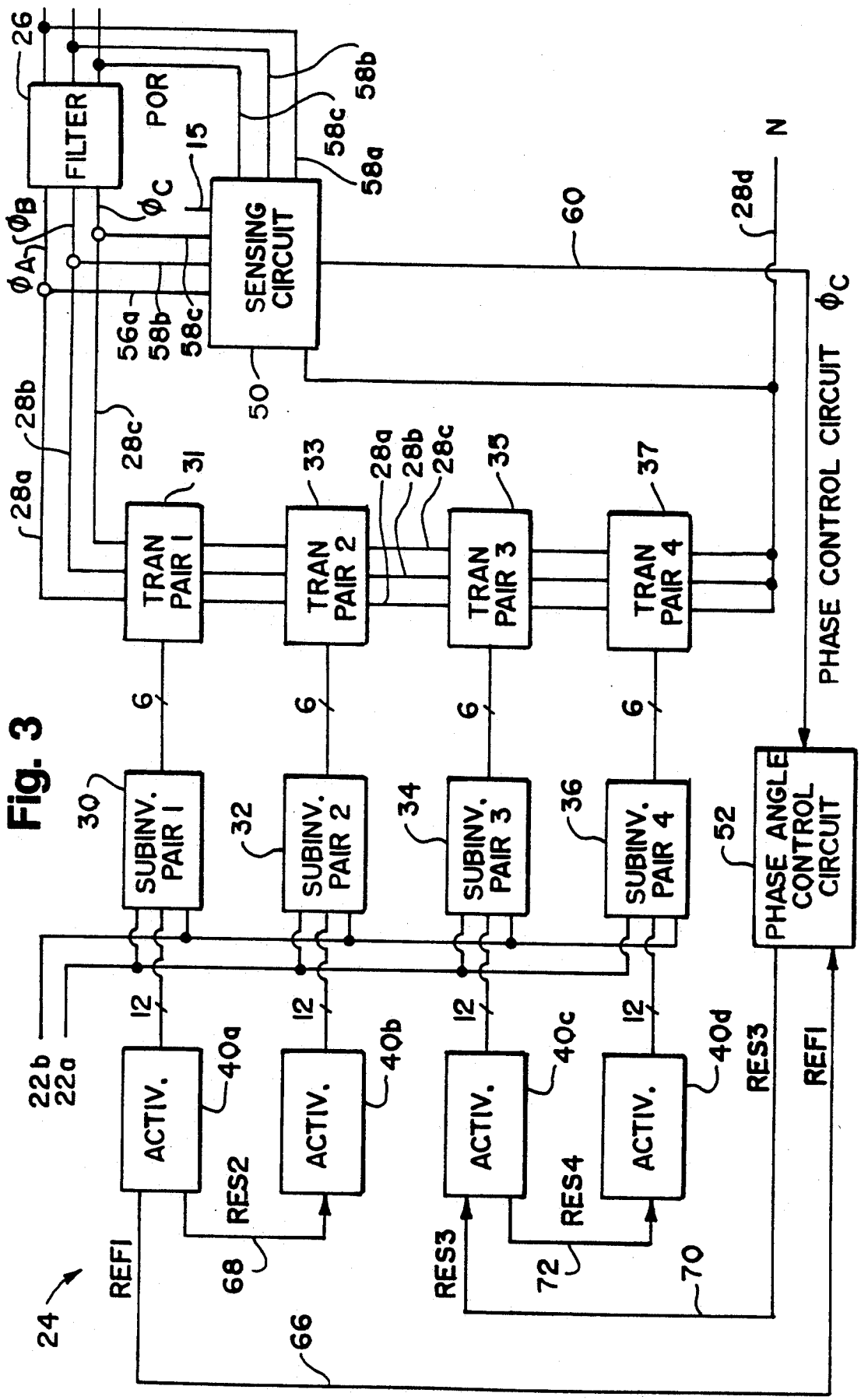
FIG. 3 is a block diagram of the inverter of FIG. 1.

One arrangement for the circuits shown in FIG. 2 is illustrated in FIGS. 3-14. As shown in FIG. 3, inverter 24 includes four subinverter pairs 30, 32, 34, and 36. Each of the subinverter pairs 30, 32, 34, and 36 is coupled to a respective transformer pair 31, 33, 35, and 37. The output subinverter pairs 30, 32, 34, and 36 receive input DC from input DC lines 22a and 22b. Output lines 28a, 28b, and 28c interconnect the transformer pairs, and the transformer pair 37 is connected to neutral line 28d. Each of the subinverter pairs 30, 32, 34, and 36 is controlled by a respective activation circuit 40a, 40b, 40c, and 40d.

A regulator circuit for regulating the voltage at the POR is shown in FIG. 3 to comprise an sensing circuit 50 and phase-angle control circuit 52. Sensing circuit 50 senses the current on the three transformer output lines 28a, 28b, and 28c via three lines 56a, 56b, and 56c which may be connected to corresponding current transformers around respective transformer output lines 28a, 28b, and 28c. Sensing circuit 50 senses the voltage on the three phase output lines from filter 26 at the point of reference (POR) by way of three lines 58a, 58b, and 58c. Sensing circuit 50 generates phase control signal $\phi_c$ having a magnitude based on both the voltage at the point of reference and the current sensed on lines 28a, 28b, and 28c and provides the $\phi_c$ signal to the phase control circuit 52 by way of line 60. Based on the magnitude of $\phi_C$, the phase-angle control circuit 52 causes the phase angle between the waveforms generated by the first and second subinverter pairs 30, 32 and the waveforms generated by the third and fourth subinverter pairs 34, 36 to be varied. As a result of the control of the phase angle, the voltage at POR is regulated.

Alternatively, instead of sensing the output AC at the point of reference, the regulator circuit 50 could sense the AC output on lines 28a, 28b, and 28c before the output from transformer pairs 31, 33, 35, and 37 is filtered by filter 26.

Phase control signal $\phi_c$ is also dependent upon input 15 to sensing circuit 50. That is, signal $\phi_c$ responds to the feedforward signal on input 15 in order to anticipate changes at the point of reference resulting from a rate of change in input DC on lines 22a and 22b.

Phase angle control circuit 52 varies the magnitude of the phase angle between the waveforms from subinverter pairs 30, 32 and the waveforms from subinverter pairs 34, 36 by generating reset signal RES3 based upon the magnitude of phase control signal $\phi_c$ and reference signal REF1. Signal REF1 is transmitted to phase angle control circuit 52 from activation circuit 40a by way of line 66. Signal RES3 is transmitted from phase angle control circuit 92 to activation circuit 40c by way of line 70. As described in more detail below, signal RES3 controls the phase angle between the waveforms generated by first and second subinverter pairs 30, 32 and the waveforms generated by third and fourth subinverter pairs 34, 36.

Activation circuit 40a generates reset signal RES2 which is transmitted to activation circuit 40b by way of line 68, and activation circuit 40c generates reset signal RES4 which is transmitted to activation circuit 40d by way of line 72. As described in more detail below, signal RES2 causes the phase angle between the waveforms from first and second subinverter pairs 30 and 32 to be fixed and signal RES4 causes the phase angle between the waveforms from third and fourth subinverter pairs 34 and 36 to be fixed.

Figure 4:
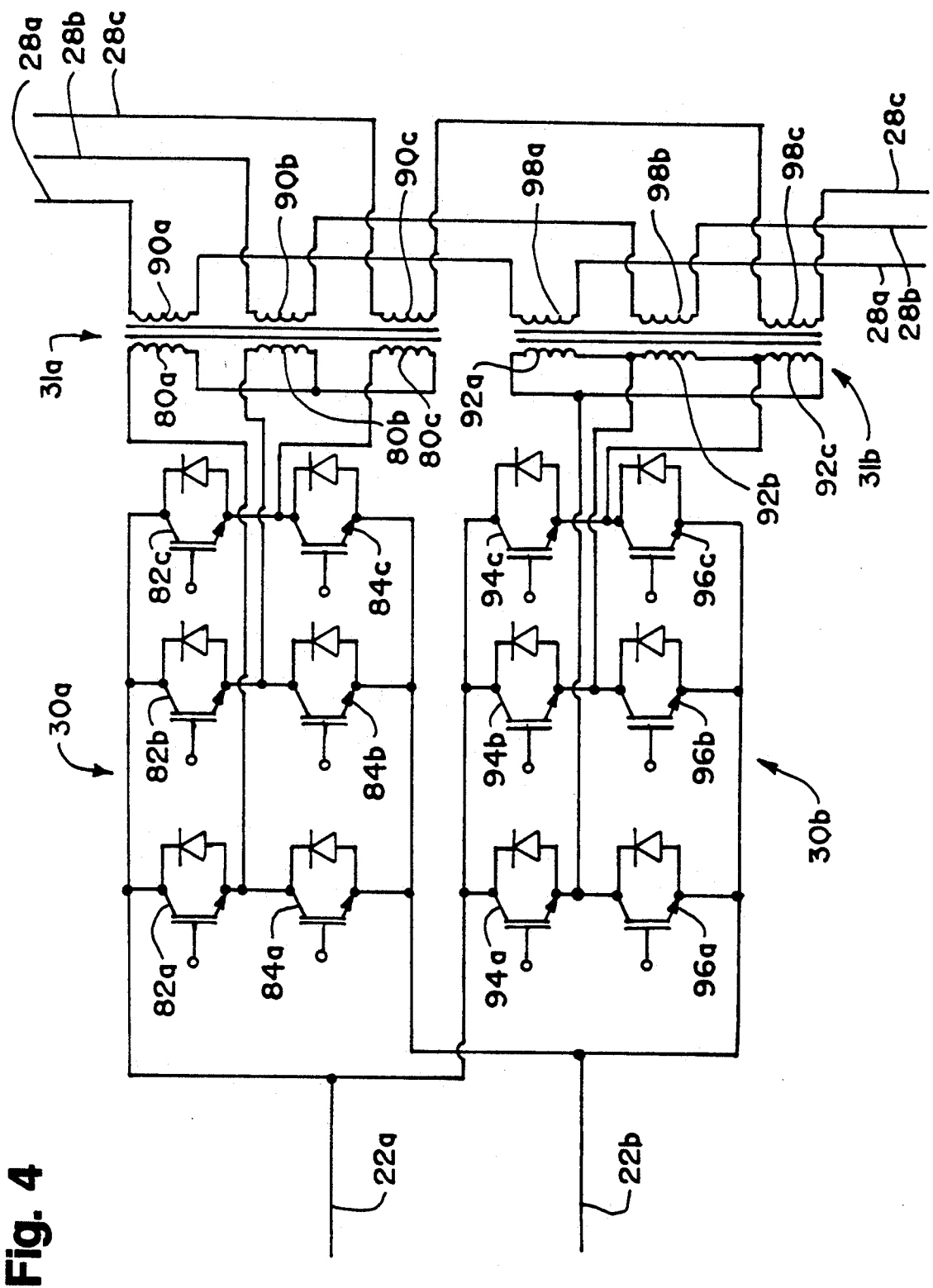
FIG. 4 is a circuit diagram of a first subinverter pair and their associated transformers of the inverter of FIG. 3.

First subinverter pair 30 and first transformer pair 31 are shown in FIG. 4, it being understood that subinverter pairs 32, 34, and 36 and transformer pairs 33, 35, and 37, may be similar. First subinverter pair 30 includes two subinverters 30a and 30b and first transformer pair 31 includes three-phase transformers 31a and 31b.

Subinverter 30a includes six transistor switches 82a, 82b, 82c, 84a, 84b, and 84c, each of which has a diode connected thereacross. Subinverter 30a is connected to three wye-connected primary windings 80a, 80b, and 80c of transformer 31a which are controlled by the three pairs of switches 82a-c and 84a-c. The upper terminal of winding 80a is connected to the junction of switches 82a, 84a; the upper terminal of winding 80b is connected to the junction of switches 82b and 84b; and the upper terminal of winding 80c is connected to the junction of switches 82c and 84c. Primary windings 80a-c of transformer 31a are magnetically coupled to three secondary windings 90a, 90b, and 90c, respectively.

During operation of subinverter 30a, one of the two switches in each vertical branch is conducting. In particular, one of two switches 82a and 84a is conducting and the other is off; one of the switches 82b and 84b is conducting and the other is off; and, one of the switches 82c and 84c is conducting and the other is off. Switches 82a-c and 84a-c are switched in a conventional manner to generate waveform 220 shown in FIG. 6 on each of the three wye-connected windings 80a, 80b, and 80c. Each of the three waveforms 220 differ in phase by 120°. Because windings 80a-c are wye-connected, waveform 220 has four possible amplitudes ⅔A, ⅓A, −⅓A, −⅔A, where A is the maximum amplitude.

Subinverter 30b includes six transistor switches 94a, 94b, 94c, 96a, 96b, and 96c each of which has a diode connected across it. Subinverter 30b is connected to three delta-connected primary windings 92a, 92b, and 92c of transformer former 31b which are controlled by three pairs of the switches 94a-c and 96a-c. The upper terminal of winding 92a is connected to the junction of switches 94a and 96a; the upper terminal of winding 92b is connected to the junction of switches 94b and 96b; and, the upper terminal of winding 92c is connected to the junction of switches 94c and 96c. The three delta-connected primary windings 92a-c are magnetically coupled to three secondary windings 98a-c of transformer 31b, respectively. Secondary winding 98a is connected in series with secondary winding 90a in line 28a, secondary winding 98b is connected in series with secondary winding 90b in line 28b, and secondary winding 98c is connected in series with secondary winding 90c in line 28c.

Figure 5:
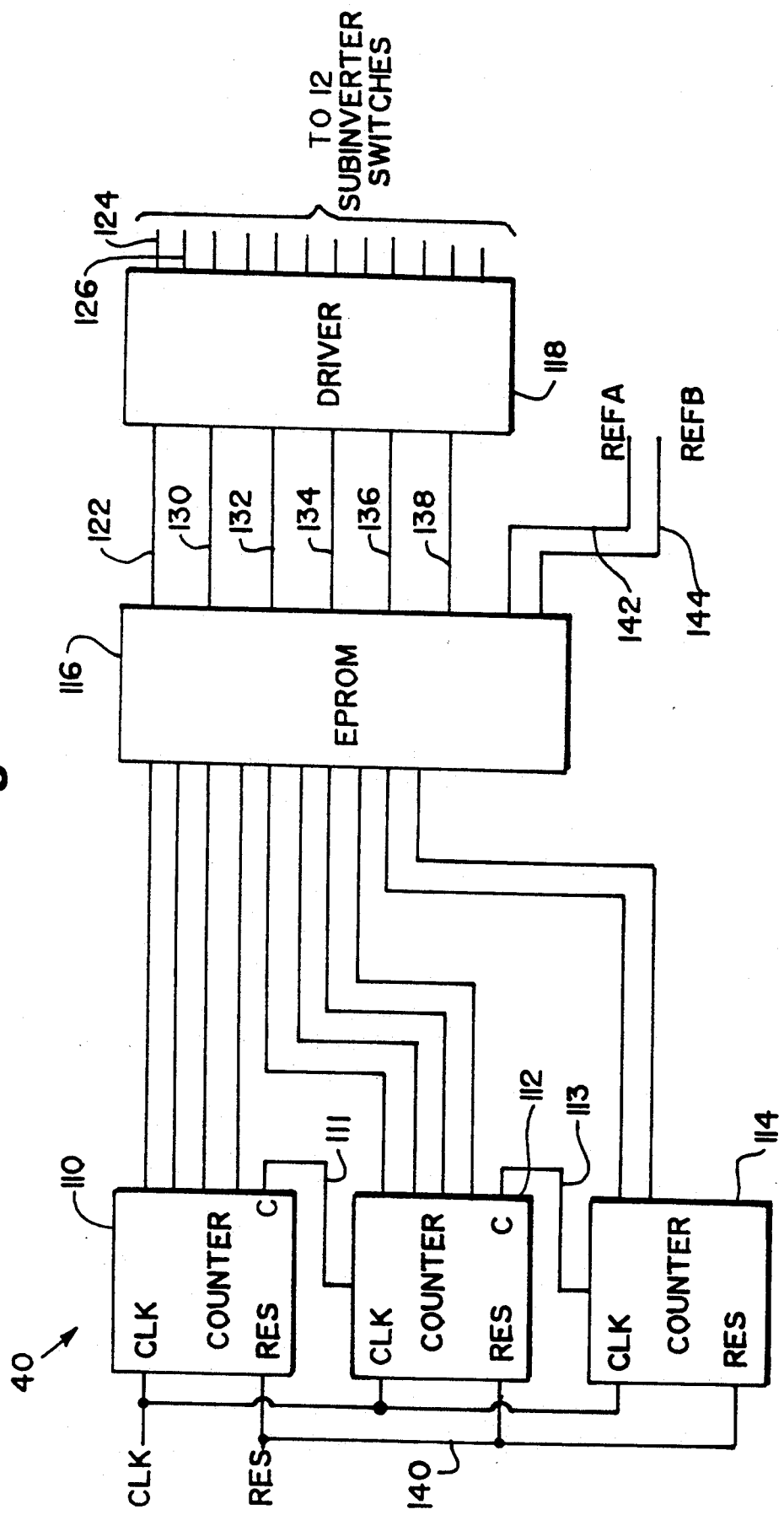
FIG. 5 is a circuit diagram of one of the activation circuits of the inverter of FIG. 3.

Switches 94a-c and 96a-c are switched in a manner similar to switches 82a-c and 84a-c to generate waveform 222 in FIG. 5 on each of the three delta-connected windings 92a, 92b, and 92c. Each of the three waveforms 222 have a phase difference of 120° with respect to one another. Because the windings are delta-connected, such a waveform has three possible amplitudes, +A, 0, and −A, where A is the maximum amplitude.

While switches 82a-c, 84a-c, 94a-c, and 96a-c are shown to be transistors, other types of switches may be used, such as gate turn off devices or darlington-connected transistor pairs.

The circuit diagrams for the second, third, and fourth subinverter pairs 32, 34, and 36 and the second, third, and fourth transformer pairs 33, 35, and 37 can be identical to the one shown in FIG. 3 and are not shown separately for purposes of simplicity.

The activation of the 12 switches 82a-c, 84a-c, 94a-c, and 96a-c in each of the subinverter pairs is controlled by a respective one of the activation circuits 40a, 40b, 40c, and 40d. Since the four activation circuits can be identical, only one is shown in FIG. 5. Activation circuit 40 includes three four-bit counters 110, 112, and 114 connected to EPROM 116 which is connected to driver circuit 118. Counters 110, 112, and 114 are driven by clock signal CLK generated by a main controller (not shown). The carry output of counter 110 is used as an input to counter 112 by way of line 111, and the carry output of counter 112 is used as a carry input to counter 114 by way of line 113. Upon each pulse of the CLK signal, the ten-bit output of counters 110, 112, and 114 is incremented by one. This 10-bit output is used as an address for EPROM 116.

EPROM 116 has a six-bit binary code stored in each of its address locations. The six binary bits control the activation of the twelve switches in one of the subinverters. In particular, one bit of the six-bit binary code is output on the line 122 to the driver 118, which driver generates a pair of complemented switching signals on line 124 and line 126. Line 124 is connected to the base of one switch in one vertical branch of one of the subinverters, such as switch 82a, and line 126 is connected to the base of the other switch in that vertical branch, such as switch 84a.

The remaining 5 bits of the six-bit binary code are output on lines 130, 132, 134, 136, and 138, respectively, to driver circuit 118 which driver circuit generates on its outputs a pair of complemented driving signals for each of the five binary signals. These driving signals are supplied to respective pairs of the remaining switches of the subinverter.

Figure 6:
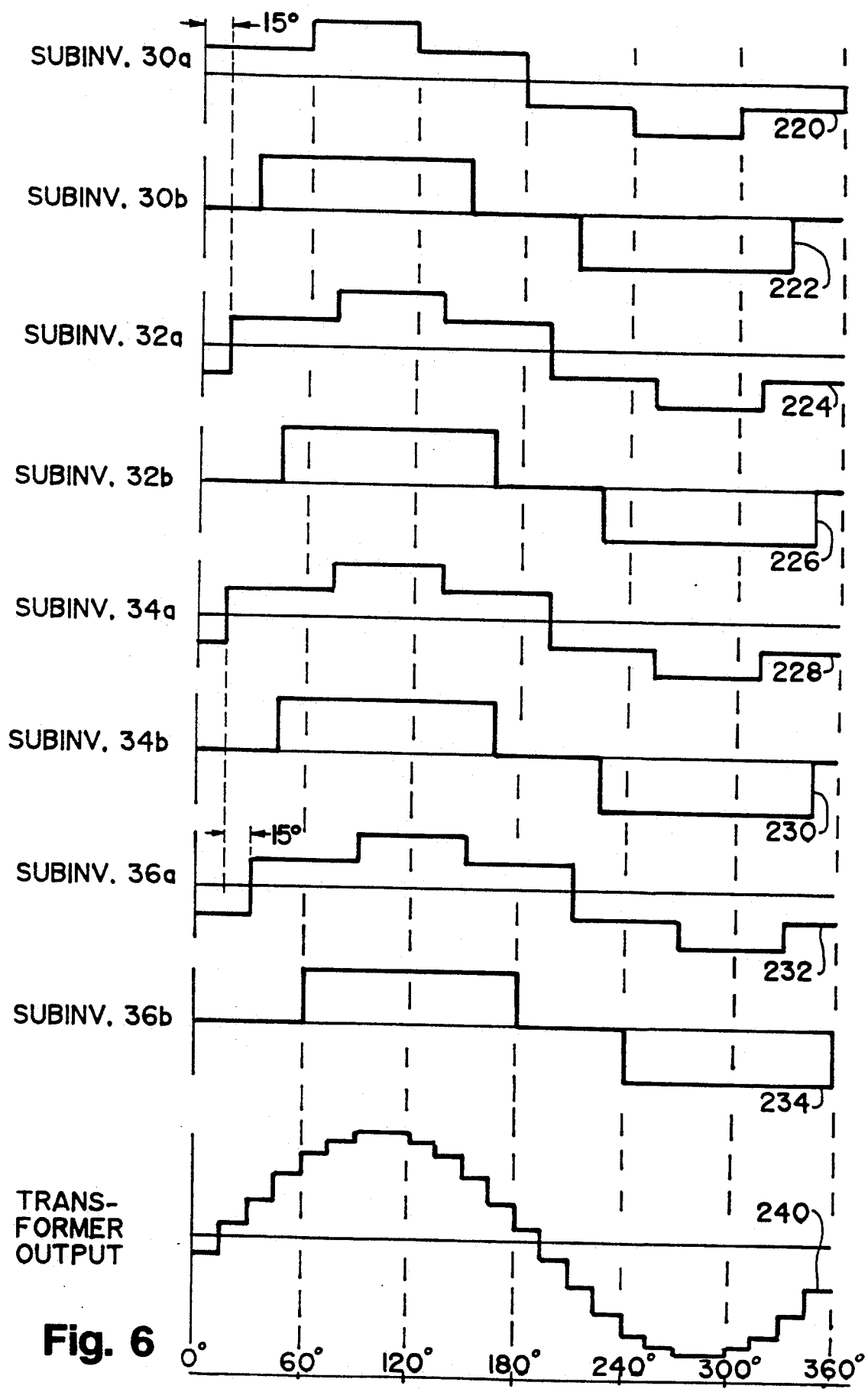
FIG. 6 illustrates a first-phase relationship of a number of waveforms generated by the inverter and a waveform produced by the summation of those waveforms.

During operation of activation circuit 40, as the CLK signal periodically increments counters 110, 112, and 114, the six bits of the binary code are periodically output from EPROM 116 via lines 122 and 130-138 to driver 118, and the twelve switches of each of the subinverters 30a, 30b, 32a, 32b, 34a, 34b, 36a, and 36b are controlled to generate waveforms 220, 222, 224, 226, 228, 230, 232, and 234 shown in FIG. 6 in the primary windings in each of the transformers 31a, 31b, 33a, 33b, 35a, 35b, 37a, and 37b, respectively.

EPROM 116 generates a first reference signal REFA on line 142 and second reference signal REFB on line 144. Reset signal RES may be input to counters 110, 112, and 114 by way of line 140. When the RES signal is activated, counters 110, 112, and 114 are reset, thus providing a ten-bit address to EPROM 116 equal to zero. The contents of each EPROM in the four activation circuits 40a, 40b, 40c, and 40d can be identical. If each of the EPROMS is given the same sequence of addresses, the resulting waveforms generated by the subinverters would be identical and thus have zero phase angle. Accordingly, the time of reset of counters 110, 112, and 114 of one activation circuit determines the phase angle between the waveforms generated by that activation circuit and the waveforms generated by the other activation circuits.

When activation circuit 40 of FIG. 5 is used for the activation circuit 40a shown in FIG. 3, the REFA line 142 of FIG. 5 is connected to REF1 line 66 of FIG. 3, and REFB line 144 of FIG. 5 is connected to RES2 line 68 of FIG. 3. When activation circuit 40 of FIG. 5 is used for activation circuit 40b, RES line 140 of FIG. 5 is connected to RES2 line 68 of FIG. 3, and REFA and REFB lines 142 and 144 of FIG. 5 are not used. When activation circuit 40 of FIG. 5 is used for activation circuit 40c shown in FIG. 3, REFA line 142 of FIG. 5 is connected to RES4 line 72 of FIG. 3, REFB line 144 of FIG. 5 is not used, and RES line 140 of FIG. 5 is connected to RES3 line 70 in FIG. 3. When activation circuit 40 of FIG. 5 is used for activation circuit 40d, RES line 140 of FIG. 5 is connected to RES4 line 72 of FIG. 3, and REFA and REFB lines 142 and 144 of FIG. 5 are not used.

Stepped waveform inverters having eight subinverters as shown in FIG. 3 are referred to as 48-step inverters, although the invention applies equally well to 24-step inverters using two subinverter pairs or a 36-step inverter using three subinverter pairs.

In FIG. 6, the waveforms generated by subinverters 30a, 30b, 32a, 32b, 34a, 34b, 36a, and 36b in primary windings of the transformers 31a, 31b, 33a, 33b, 35a, 35b, 37a, and 37b are shown. The summing transformer output waveform 240, which is the last waveform shown in FIG. 6, is generated on each of the three transformer output lines 28a, 28b, and 28c with each of the three waveforms 240 being 120° apart.

In the operation of the inverter, the phase angle between the waveforms generated by first and second subinverter pairs 30 and 32 and the waveforms generated by third and fourth subinverter pairs 34 and 36 is varied depending upon the voltage at the POR and the level of the parameter relating to the input DC on lines 28a and 22b.

Figure 7:
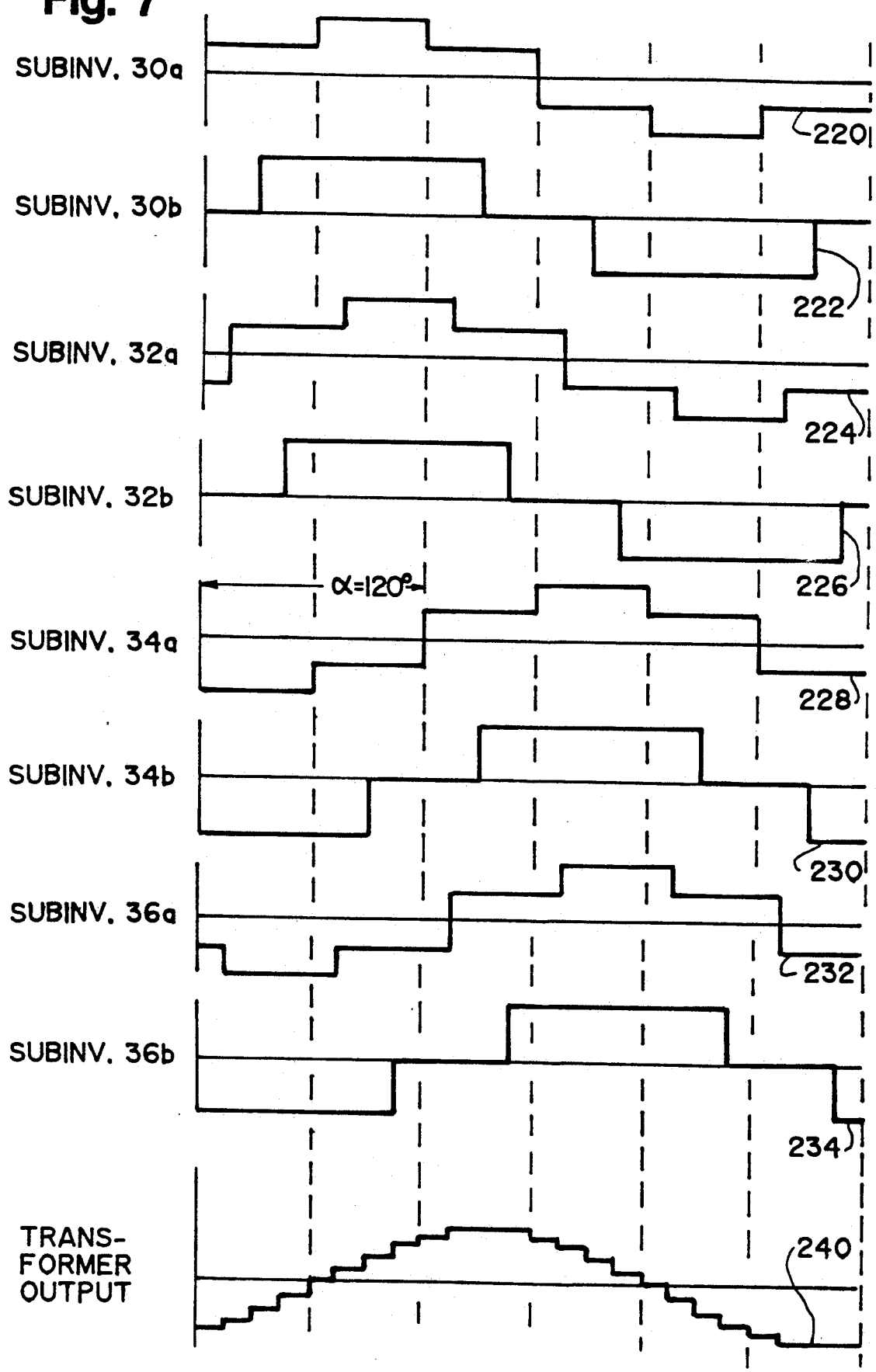
FIG. 7 illustrates a second-phase relationship of a number of waveforms generated by the inverter and a waveform produced by the summation of those waveforms.

FIGS. 6–8 illustrate the various phase relationships of the subinverter waveforms during operation of inverter 24. In FIGS. 6–8, the phase angle between the first subinverter pair waveforms 220 and 222 and the second subinverter pair waveforms 224 and 226 is fixed at 15°. Likewise, the phase angle between the third subinverter pair waveforms 228 and 230 and the fourth subinverter pair waveforms 232 and 234 is fixed at 15°. However, the phase angle between waveforms 220, 222, 224, and 226 produced by the first and second subinverter pair waveforms and the waveforms 228, 230, 232, and 234 produced by the third and fourth subinverter pairs is variable. For example, this variable phase angle is 15° in FIG. 6, 120° in FIG. 7, and 180° in FIG. 8.

The resultant output voltage may be regulated by controlling the phase angle between the first and second subinverter pair waveforms and the third and fourth subinverter pair waveforms. For example, waveform 240 has a peak positive amplitude of +160 V and a peak negative amplitude of −160 V in FIG. 6, a peak positive amplitude of +80 V and a peak negative amplitude of −80 V in FIG. 7, and a 0 amplitude in FIG. 8.

Figure 9A:
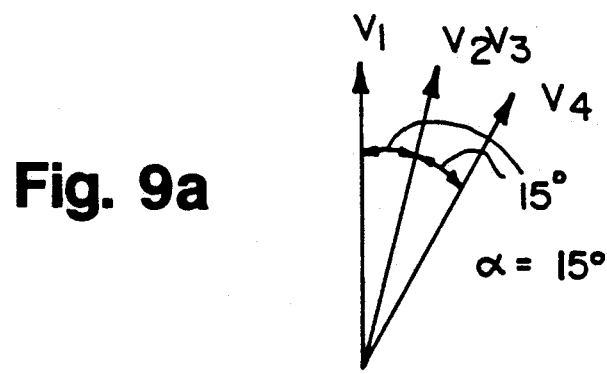
FIGS. 9a–9c are vector diagrams illustrating the operations of the inverter.
Figure 9B:
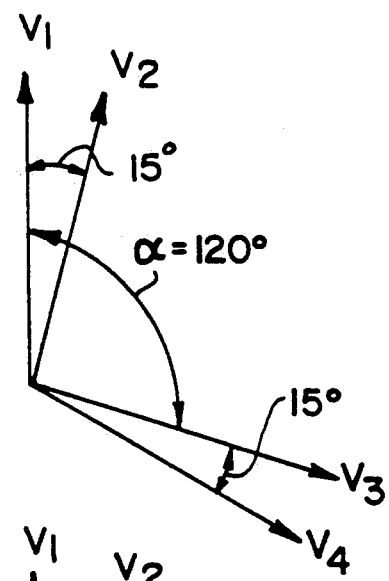
Figure 9C:
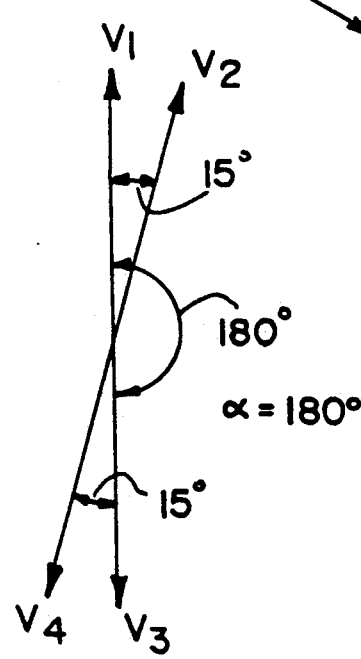

In FIGS. 9a–9c, the vector diagrams in those figures illustrate these modes of operation. Vector $V_1$ represents the first subinverter pair waveforms 220 and 222; vector $V_2$ represents the second subinverter pair waveforms 224 and 226; vector $V_3$ represents the third subinverter pair waveforms 228 and 230; and, vector $V_4$ represents the fourth subinverter pair waveforms 232 and 234. The phase angle between $V_1$ and $V_2$ is held at a constant 15° as is the phase angle between $V_3$ and $V_4$.

The phase angle between $V_1$ and $V_3$ (and consequently between $V_2$ and $V_4$), however, is variable. This variable phase angle can vary, for example, from 15° as shown in FIGS. 6 and 9a, to 120° as shown in FIGS. 7 and 9b, to 180° as shown in FIGS. 8 and 9c.

Figure 10:
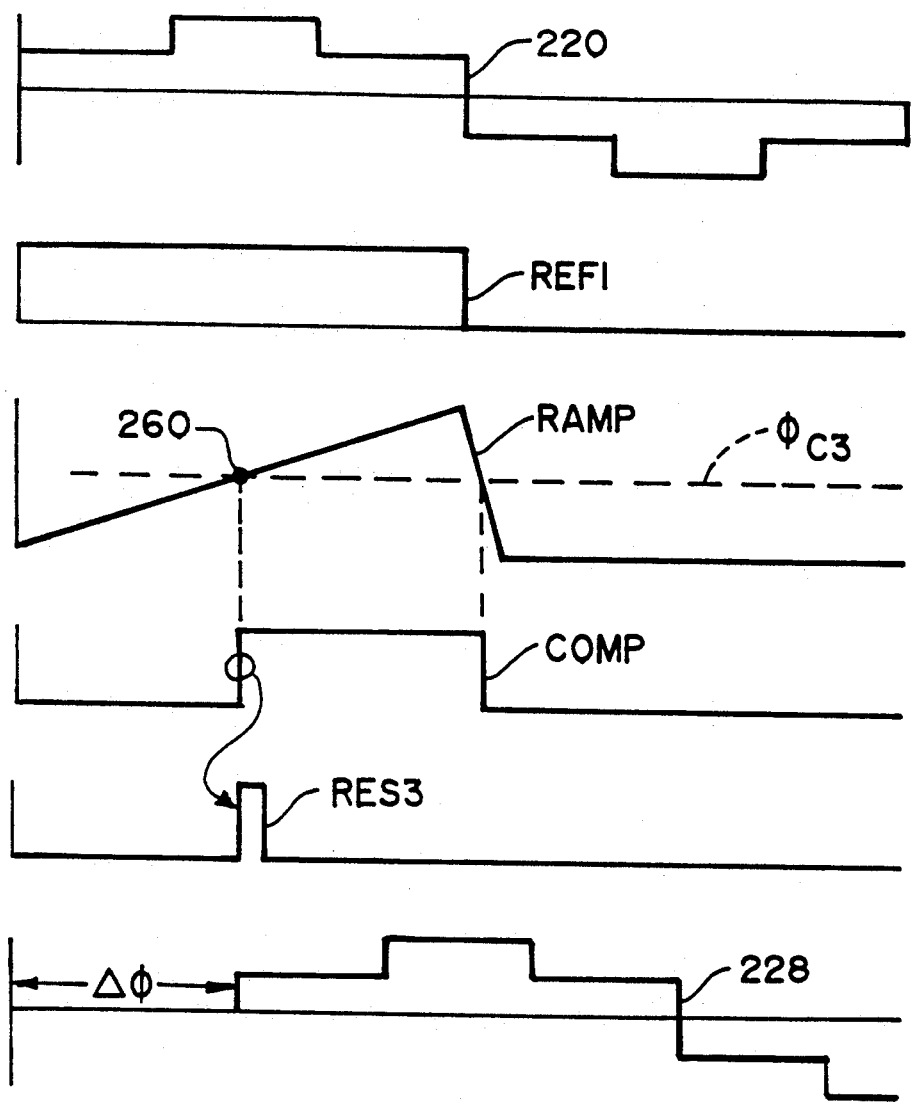
FIG. 10 illustrates various waveforms relating to the operation of the phase-angle control circuit of FIG. 3.

One manner of controlling the variable phase angle between the first and third subinverter pair waveforms is illustrated in FIG. 10. In FIG. 10, waveform 220 generated in first subinverter wye-connected windings 80a–c is shown in its phase relationship with respect to REF1. As can be seen, REF1 changes from zero to positive when waveform 220 transitions to a positive amplitude and from positive to zero when waveform 220 transitions to a negative amplitude. Signal RAMP is generated based upon the magnitude of signal REF1. When signal REF1 is positive, the amplitude of RAMP signal slowly increases. When the magnitude of signal REF1 changes to zero, the magnitude of RAMP quickly decreases to zero.

Signal RAMP is used to generate signal RES3 based on a phase control signal $\phi_{c3}$ generated from phase control signal $\phi_c$ of FIG. 3. The magnitude of signal $\phi_{c3}$ varies, depending upon the magnitude of the voltage sensed at the POR, the current sensed on lines 28a–c and the voltage sensed on DC link 22a, 22b. The relative values of RAMP and $\phi_{c3}$ are used to generate comparison signal COMP having a positive amplitude when the value of signal RAMP is greater than the value of $\phi_{c3}$ and a zero amplitude when the value of signal RAMP is less than the value of signal $\phi_{c3}$. The point of intersection of the rising portion of signal RAMP and signal $\phi_{c3}$ determines the magnitude of the phase delay between the subinverter waveforms 220 and 228. This intersection point is shown as point 260 in FIG. 10.

At the intersection point 260, signal COMP changes from zero to a positive amplitude. The rising edge of signal COMP triggers signal RES3 to become positive, or activated. When signal RES3 is activated, it resets the counters associated with third subinverter pair 34. As a result, the counters produce a zero ten-bit address, and the corresponding EPROM initiates generation of waveform 228.

The contents of the EPROM associated with each subinverter pair 30, 32, 34, and 36 can be identical. If each of the EPROMs is given the same sequence of addresses, the resulting waveforms would be identical and have zero phase angle difference. Accordingly, the time of reset of the counters associated with each activation circuit determines the phase angle between the waveforms associated with that activation circuit and the waveforms associated with the other activation circuits.

Thus, with respect to FIG. 10, the time occurrence of the rising edge of signal RES3 controls the phase difference between waveform 220 and waveform 228.

It should be appreciated that the magnitude of signal $\phi_{c3}$ determines the magnitude of the phase delay between waveforms 220 and 228. If the magnitude of signal $\phi_{c3}$ is larger, signal $\phi_{c3}$ will intersect the signal RAMP later thus causing a larger phase delay. If the magnitude of signal $\phi_{c3}$ is smaller, signal $\phi_{c3}$ will intersect the signal RAMP earlier causing a smaller phase delay.

Figure 11:
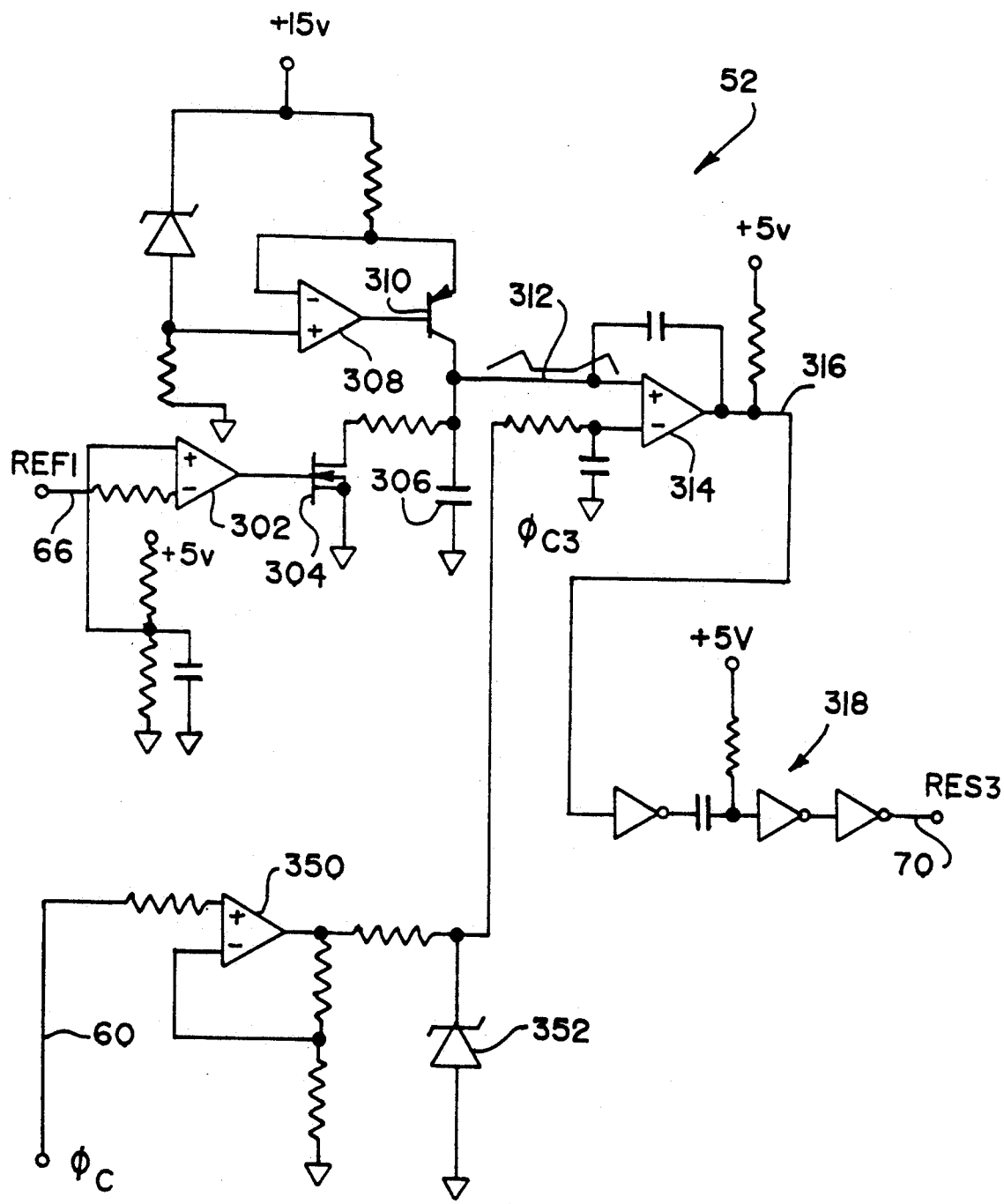
FIG. 11 is a circuit diagram of the phase-angle control circuit shown schematically in FIG. 3.

One phase angle control circuit 52 for accomplishing the control of the variable phase angle between subinverter pairs 30 and 32 and subinverter pairs 34 and 36 (i.e., between waveform 220 and waveform 228) is shown in FIG. 11. The REF1 and $\phi_c$ signals are supplied to phase angle control circuit 52 by way of lines 66 and 60, respectively, and circuit 52 generates signal RES3 on line 70. In FIG. 11, circuit 52 includes a RAMP generator comprising comparator 302 having an inverting input which receives signal REF1 and a noninverting input that receives a predetermined reference voltage. The RAMP signal generator also includes transistor 304, capacitor 306, and a constant current source comprising operational amplifier 308 and transistor 310.

Capacitor 306 is slowly charged by the constant current source through transistor 310 when transistor 304 is nonconducting and is quickly discharged through transistor 304 when transistor 304 becomes conductive. Transistor 304 conducts when the value of the signal REF1 is less than the predetermined voltage provided at the noninverting input of comparator 302. As a result, the signal RAMP is produced on line 312.

The signal RAMP is input to the noninverting input of comparator 314 by way of line 312. The inverting input of comparator 312 is supplied with signal $\phi_{c3}$ having a magnitude based upon signal $\phi_c$. Comparator 314 generates on line 316 a comparison signal COMP having a high output when the value of the RAMP signal is greater than $\phi_{c3}$ and a low output when the value of the RAMP signal is less than the value of $\phi_{c3}$. The comparison signal on line 316 is provided to a monostable multivibrator or one shot 318 comprising three inverters and a capacitor. The output of one shot 318 provides signal RES3 which determines the phase angle between the waveforms of the first subinverter pair 30 and the third subinverter pair 34 (and consequently also the phase angle between the waveforms of the second subinverter pair 32 and the fourth subinverter pair 36).

The magnitude of $\phi_{c3}$ is determined by amplifier 350 and Zener diode 352 shown in FIG. 11. Amplifier 350 acts as a voltage follower. The output of amplifier 350 follows the magnitude of signal $\phi_c$. Zener diode 352 is connected to the output of amplifier 350 and acts to limit the magnitude of signal $\phi_{c3}$ to a maximum predetermined value. This predetermined value is the voltage that causes the maximum phase angle difference of 180° between the waveforms of the first and third subinverter pairs.

Figure 12:
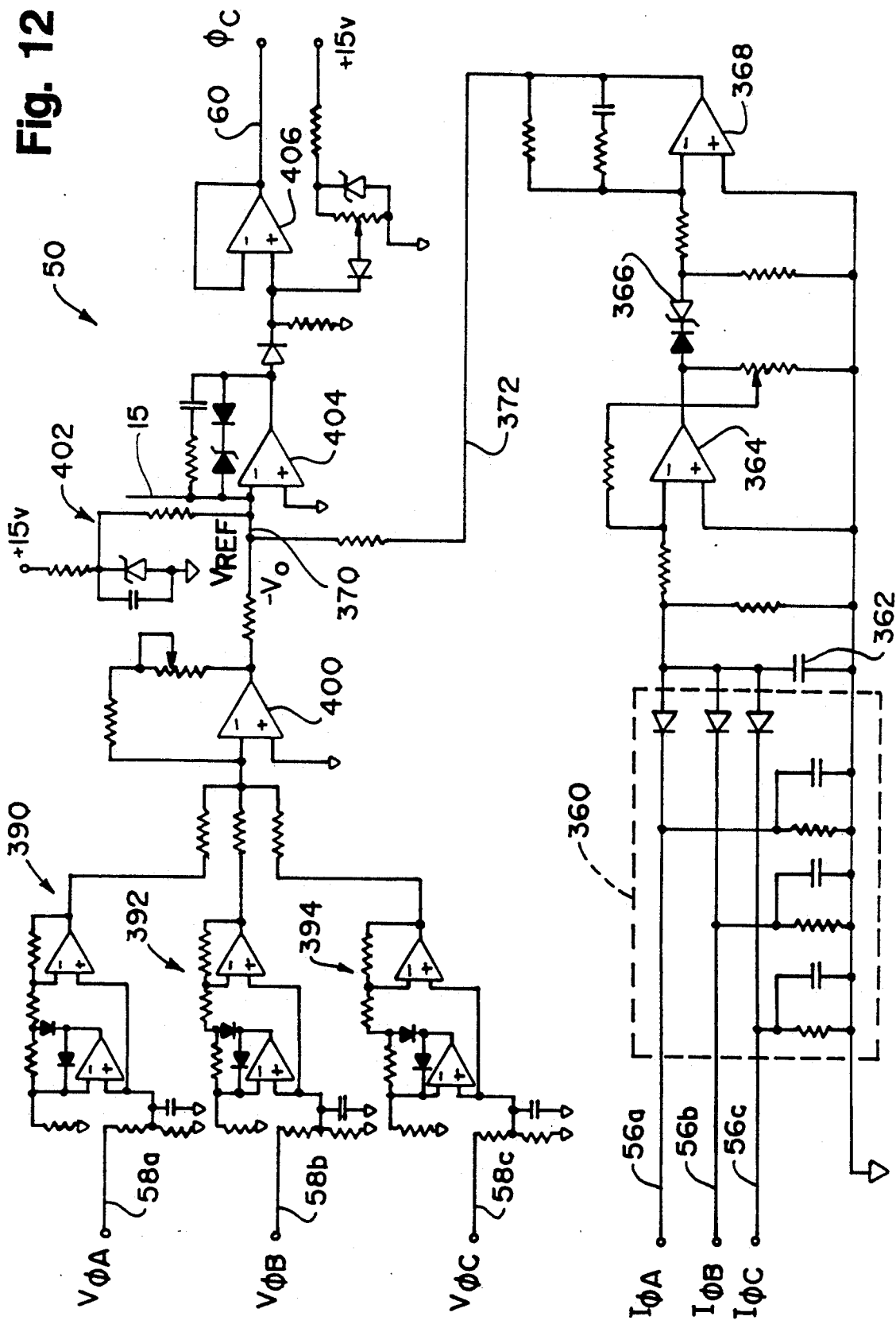
FIG. 12 is a circuit diagram of the sensing circuit shown schematically in FIG. 3.

Signal $\phi_c$ is generated by sensing circuit 50 based upon the currents in lines 28a–c, the voltage at the point of reference, and the DC link voltage. Sensing circuit 50 is shown in detail in FIG. 12. In FIG. 12, sensing circuit 50 includes a first portion which generates a voltage based on the amount of current sensed in lines 56a, 56b, and 56c. The three phases of output current, $I_{\phi A}$, $I_{\phi B}$, and $I_{\phi C}$, on lines 56a, 56b, and 56c, respectively, are rectified by half-wave rectifier circuit 360. The output of half-wave rectifier circuit 360 is filtered by smoothing capacitor 362 and then provided to the inverting input of operational amplifier 364 used for scaling purposes. The output of operational amplifier 364 is passed through Zener diode 366 which is coupled to the inverting input of operational amplifier 368 that acts as an inverter. The operational amplifier 368 generates a negative voltage, $-I_0$, that is zero if the amount of current sensed in lines 56a, 56b, and 56c is not above a predetermined threshold. As shown in FIG. 2, this threshold is two units. If the current sensed is above the threshold, then the magnitude of $-I_0$ is proportional to the amount of current over the threshold. Signal $-I_0$ is transmitted to summing point 370 by way of line 372.

Precision full-wave rectifiers 390, 392, and 394 are connected to receive phase voltages $V_{\phi A}$, $V_{\phi B}$, and $V_{\phi C}$ from the point of reference POR. The rectified phase voltages are summed at the inverting input of operational amplifier 400. Operational amplifier 400 generates a negative voltage at its output, $-V_0$, which has a magnitude that is proportional to the average voltage sensed at POR. Signal $-V_0$ is transmitted to summing point 370.

Summing point 370 is also connected to circuit 402 which generates a predetermined reference voltage $V_{ref}$. Voltage $V_{ref}$ represents the desired voltage at which the transformer output at POR should be kept. Summing junction 370 also receives an input on line 15 representing the magnitude of the rate of change of the DC voltage on DC bus 22a, 22b. At the summing point 370, $V_{ref}$, $-V_0$, $-I_0$, and the rate of change of the input DC signal on line 15 are summed to produce an error signal, $V_{err}$, which equals $V_{ref}+dV_{dc}/dt - I_0 - V_0$. In normal operation, when the magnitude of the summing transformer output current is below the predetermined current threshold, the value of $-I_0$ will be zero, and the error signal will equal $V_{ref}+dV_{dc}/dt - V_0$. However, if the output current exceeds the threshold, then $I_0$ will be a nonzero value and it will effectively reduce the magnitude of the predetermined voltage $V_{ref}$ at POR. If the current is large enough, the magnitude of $I_0$ will become as large as $V_{ref}+dV_{dc}/dt$ and the effective reference voltage $V_{ref}+dV_{dc}/dt - I_0$ will become zero. As a result, the actual voltage $V_0$ will be reduced to zero. The amount of sensed current necessary to reduce the effective reference voltage to zero is at 3 per unit as shown in FIG. 2. Thus, when the current reaches this value, the output voltage at the point of reference drops to zero. If $V_{dc}$ changes, the controller will change the phase angle between the waveforms of subinverters 30 and 34 to counteract the change in $V_{dc}$ without having to wait through the system time constants.

The summed error voltage at summing point 370 is provided as an input to the inverting input of operational amplifier 404 which integrates the error. Amplifier 404 is coupled to operational amplifier 406 that acts as a buffer and which produces signal $\phi_c$ which ultimately determines the phase angle between the waveforms generated by the first and third subinverter pairs 30 and 34.

Figure 13:
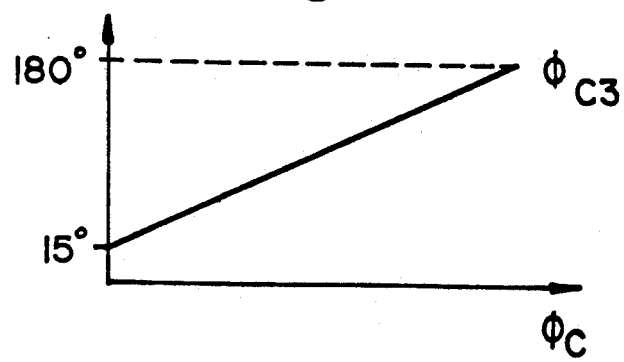
FIG. 13 is a graph of a voltage signal used in the phase-angle control circuit to control the phase relationship of the waveforms generated by the inverter; and, FIGS. 14a and 14b illustrate the manner of generating a constant phase angle between the subinverter pair waveforms of the inverter.

In FIG. 13, the magnitude of phase control signal $\phi_{c3}$ with respect to signal $\phi_c$ during operation of the inverter is shown. Signal $\phi_{c3}$ has a minimum voltage that produces a minimum phase angle of 15° between the waveforms of the first and third subinverter pairs 30 and 34. Signal $\phi_{c3}$ has a maximum voltage that produces the maximum phase angle of 180°.

Figure 14A:
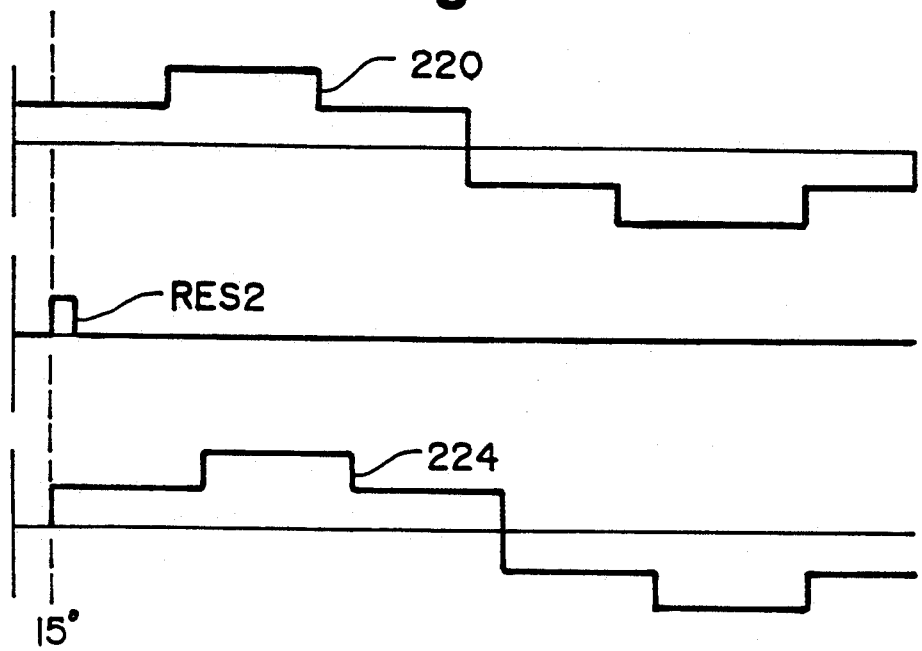

The manner of generating the fixed phase angle between the waveforms of the first and second subinverter pairs 30 and 32 is illustrated in FIG. 14a. The fixed phase angle is determined by signal RES2 which determines the time of reset of the counters associated with second subinverter pair 32a and 32b. As shown in FIG. 14a, signal RES2 is activated 15° after the beginning of waveform 220. Since the beginning of waveform 224 coincides with activation of signal RES2, waveform 224 begins at 15° as shown in FIG. 14a.

Figure 14B:
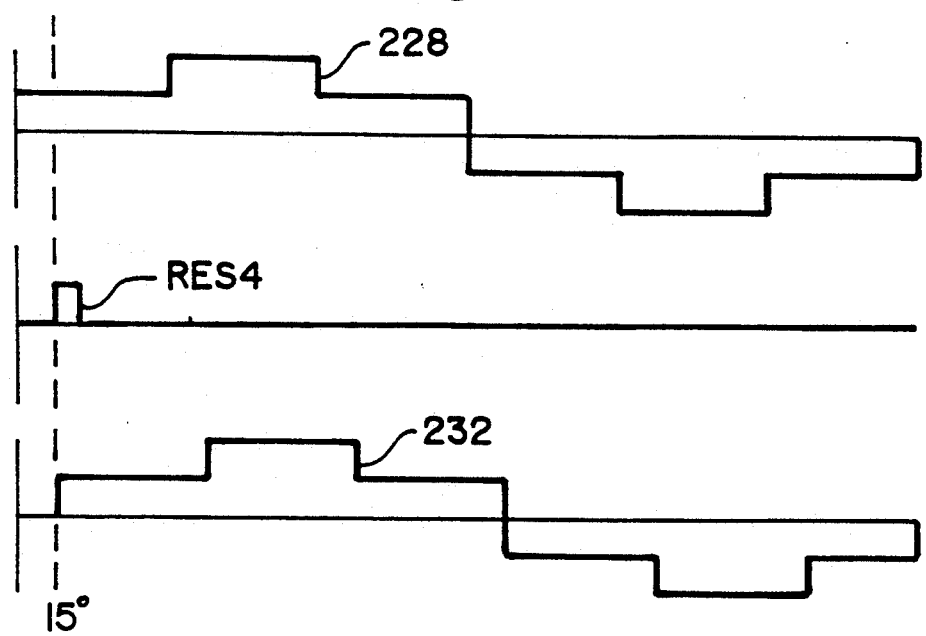

The manner of generating the fixed phase angle between the waveforms of the third and fourth subinverter pairs 34 and 36 as illustrated in FIG. 14b. The fixed phase angle is determined by signal RES4 which determines the time of reset of the counters associated with the fourth subinverter pair 36a and 36b. As shown in FIG. 14b, signal RES4 is activated 15° after the beginning of waveform 228. Since the beginning of waveform 232 coincides with the activation of signal RES4, waveform 232 begins at 15° as shown in FIG. 14b.

As either the voltage at the point of reference POR or the voltage of the DC link 22a, 22b varies, the variable phase angle between waveform 220 and waveform 228 will be adjusted in order to maintain the voltage at the point of reference POR at the value determined by $V_{ref}$ or the combination of $V_{ref}$ and $I_o$ if $I_o$ is above its minimum value.

The fixed phase angle between waveforms 220 and 224 and between waveforms 228 and 232 could be generated in another manner. Instead of making the contents of the four EPROMs identical so that if all the EPROMs are reset at the same time the phase angle difference between the waveforms would be zero, the contents of the EPROM associated with the first subinverter pair 30 could be shifted with respect to the contents of the EPROM associated with the second subinverter pair 32 so that when both EPROMs were reset, a 15° phase angle between their respective waveforms would be produced. Similarly, the contents of the EPROM associated with the third subinverter pair 34 could be shifted with respect to the contents of the EPROM associated with the fourth subinverter pair 36 so that when both EPROMs are reset, a 15° phase angle between their respective waveforms would be produced. As a result, signals RES2 and RES4 would be unnecessary. Also, two of the four sets of counters associated with EPROMs could be eliminated since the remaining two sets of counters could each drive a pair of EPROMs.

It should be appreciated that another fixed phase angle between the first and second subinverter waveforms and between the third and fourth subinverter waveforms could be used. For example, instead of a fixed angle of 15°, 10° could be used.

Modifications and alternative embodiments of the invention will be apparent to those skilled in the art in view of the foregoing description. Accordingly, this description is to be construed as illustrative only and is for the purpose of teachings those skilled in the art the best mode of carrying out the invention. The details of the structure may be varied substantially without departing from the spirit of the invention, and the exclusive use of all modifications which come within the scope of the appended claims is reserved.

What is claimed is:

1. An inverter system for receiving input DC and for providing a controlled output AC from said input DC, said inverter system comprising:
    inverting means for inverting said input DC to said controlled output AC;
    feedforward sensing means for sensing a parameter of said input DC, said feedforward sensing means providing a feedforward signal varying in accordance with said parameter;
    feedback AC sensing means for sensing said controlled output AC, said feedback AC sensing means providing a feedback AC signal varying in accordance with said controlled output AC; and,
    inverter controlling means connected to said inverting means, to said feedforward sensing means, and to said feedback AC sensing means for controlling said controlled output AC in response to said feedforward signal and to said feedback AC signal, said inverter controlling means including comparing means for comparing said feedforward signal to said feedback signal.

2. The inverter system of claim 1 wherein said inverting means comprises first inverting means for inverting said input DC and for producing a first inverter AC output having a first phase, second inverting means for inverting said input DC and for producing a second inverter AC output having a second phase, and combining means for combining said first inverter AC output and said second inverter AC output into said controlled output AC, and wherein said inverter controlling means comprises means for controlling said controlled output AC by controlling said first and second phases with respect to one another by an amount dependent upon the comparison of said feedforward signal and said feedback AC signal.

3. The inverter system of claim 1 wherein said parameter is rate of change of said input DC and wherein said feedforward sensing means comprises rate sensing means for sensing said rate of change of said input DC.

4. The inverter system of claim 3 wherein said controlled output AC has a voltage component and wherein said feedback AC sensing means comprises voltage sensing means for sensing said voltage component of said controlled output AC.

5. The inverter system of claim 4 wherein said inverting means comprises first inverting means for inverting said input DC and for producing a first inverter AC output having a first phase, second inverting means for inverting said input DC and for producing a second inverter AC output having a second phase, and combining means for combining said first inverter AC output and said second inverter AC output into said controlled output AC, and wherein said inverter controlling means comprises means for controlling said controlled output AC by controlling said first and second phases with respect to one another by an amount dependent upon the comparison of said feedforward signal and feedback AC signal.

6. The inverter system of claim 4 wherein said voltage sensing means produces an output voltage signal dependent upon said voltage component, wherein said comparing means comprises means for comparing said rate of change of said input DC, said output voltage signal, and a reference voltage.

7. The inverter system of claim 4 wherein said controlled output AC also has a current component and said feedback AC sensing means further comprises current sensing means for sensing said current component of said controlled output AC, said current sensing means providing an output current signal only when said current component of said controlled output AC exceeds a predetermined threshold.

8. The inverter system of claim 7 wherein said voltage sensing means produces an output voltage signal dependent upon said voltage component, wherein said comparing means includes means for comparing said rate of change of said input DC, said output voltage signal, said current signal, and a reference voltage.

9. The inverter system of claim 8 wherein said inverting means comprises first inverting means for inverting said input DC and for producing a first inverter AC output having a first phase, second inverting means for inverting said input DC and for producing a second inverter AC output having a second phase, and combining means for combining said first inverter AC output and said second inverter AC output into said controlled output AC, and wherein said inverter controlling means comprises means for controlling said controlled output AC by controlling said first and second phases with respect to one another by an amount dependent upon said comparison of said rate of change of said input DC, said output voltage signal, said reference voltage, and said current signal.

10. A stepped inverter system for receiving input DC and for providing a controlled output AC from said input DC, said inverter system comprising:
   first inverting means for inverting said input DC and for providing therefrom a first AC waveform having a first phase;
   second inverting means for inverting said input DC and for providing therefrom a second AC waveform having a second phase;
   summing means having a first transformer connected to said first inverting means for receiving said first AC waveform and a second transformer connected to said second inverting means for receiving said second AC waveform, said summing means summing said first and second AC waveforms into said controlled output AC, said controlled output AC having a plurality of steps;
   feedforward sensing means for sensing a parameter of said input DC, said feedforward sensing means providing a feedforward signal varying in accordance with said parameter;
   feedback AC sensing means for sensing said controlled output AC, said feedback AC sensing means providing a feedback AC signal varying in accordance with said controlled output AC; and,
   inverter controlling means connected to said first and second inverting means, to said feedforward sensing means, and to said feedback AC sensing means for controlling said controlled output AC by controlling said first and second phases with respect to one another by an amount dependent upon said feedforward signal and said feedback AC signal, said inverter controlling means including summing means for summing said feedforward signal and said feedback AC signal to produce a sum of said feedforward signal and said feedback AC signal.

11. The inverter system of claim 10 wherein said parameter is rate of change of said input DC and wherein said feedforward sensing means comprises rate sensing means for sensing said rate of change of said input DC.

12. The inverter system of claim 11 wherein said controlled output AC has a voltage component and wherein said feedback sensing means comprises voltage sensing means for sensing said voltage component of said controlled output AC.

13. The inverter system of claim 12 wherein said voltage sensing means produces an output voltage signal dependent upon said voltage component, wherein said summing means comprises means for summing said rate of change of said input DC, said output voltage signal, and a reference voltage.

14. The inverter system of claim 12 wherein said controlled output AC also has a current component and said feedback sensing means further comprises current sensing means for sensing said current component of said controlled output AC, said current sensing means providing an output current signal only when said current component of said controlled AC output exceeds a predetermined threshold.

15. The inverter system of claim 14 wherein said voltage sensing means produces an output voltage signal dependent upon said voltage component, wherein said summing means comprises means for summing said rate of change of said input DC, said output voltage signal, said output current signal, and a reference voltage.

16. A method for controlling an inverter in order to invert variable input DC into a controlled output AC, said method comprising the following steps:
   sensing a rate of change of said input DC;
   sensing the controlled output AC; and,
   controlling said inverter in response to said rate of change of said input DC and to said controlled output AC.

17. The method of claim 16 wherein said step of sensing the controlled output AC comprises the step of producing an output voltage signal dependent upon said controlled output AC, and wherein said step of controlling said inverter comprises the stp of comparing said rate of change of said input DC, said output voltage signal, and a reference, said reference establishing a desired level for said controlled output AC.

18. A method for controlling first and second inverters in order to invert variable input DC into a stepped output AC, said first inverter having a first inverter AC output of a first phase and said second inverter having a second inverter AC output of a second phase, said method comprising the following steps:
   summing said first inverter AC output and said second inverter AC output so as to produce said stepped output AC;
   sensing a variable parameter of said input DC;
   sensing the controlled output AC; and,
   controlling said first and second phases of said respective first and second inverters with respect to one another in response to said variable parameter of said input DC and to said controlled output AC by comparing said variable parameter of said input DC to said controlled output AC.

19. The method of claim 18 wherein said variable parameter is rate of change of said input DC and said controlled output AC has a voltage component and wherein said step of sensing the variable parameter of said input DC comprises the step of sensing said rate of change of said input DC and said step of sensing said controlled AC output comprises the step of sensing the voltage component of said controlled AC output.

20. The method of claim 19 wherein said step of sensing the voltage component of said controlled output AC comprises the step of producing an output voltage signal dependent upon said controlled output AC, and wherein said step of controlling first and second phases comprises the step of comparing said rate of change of said input DC, said output voltage signal, and a reference, said reference establishing a desired level for said controlled output AC.

* * * * *